US011431694B2

(12) United States Patent
Shen

(10) Patent No.: US 11,431,694 B2
(45) Date of Patent: Aug. 30, 2022

(54) SECURE ACCOUNT MODIFICATION

(71) Applicant: Advanced New Technologies Co., Ltd., George Town (KY)

(72) Inventor: Xiaoqin Shen, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/804,660

(22) Filed: Feb. 28, 2020

(65) Prior Publication Data

US 2021/0014211 A1     Jan. 14, 2021

Related U.S. Application Data

(63) Continuation of application No. PCT/CN2020/071789, filed on Jan. 13, 2020.

(30) Foreign Application Priority Data

Jul. 10, 2019 (CN) .......................... 201910618573.3

(51) Int. Cl.
*H04L 29/06* (2006.01)
*G06F 16/953* (2019.01)
*H04L 9/40* (2022.01)

(52) U.S. Cl.
CPC ............ *H04L 63/08* (2013.01); *G06F 16/953* (2019.01); *H04L 63/101* (2013.01)

(58) Field of Classification Search
CPC ..... H04L 63/102; H04L 63/101; H04L 63/08; G06F 16/953

(Continued)

(56) References Cited

U.S. PATENT DOCUMENTS

2009/0300744 A1* 12/2009 Guo ...................... H04L 63/105
726/7
2016/0248767 A1    8/2016 Le
(Continued)

FOREIGN PATENT DOCUMENTS

CN        104378343       2/2015
CN        104580118       4/2015
(Continued)

OTHER PUBLICATIONS

PCT International Search Report and Written Opinion in International Application No. PCT/CN2020/071789, dated Apr. 2, 2020, 17 pages (with machine translation).
(Continued)

*Primary Examiner* — Benjamin A Kaplan
(74) *Attorney, Agent, or Firm* — Fish & Richardson P.C.

(57) ABSTRACT

One or more implementations of the present specification provide information processing methods, apparatuses, and devices, and computer readable storage mediums. In an implementation, an information processing method includes: when a user is in a non-login state, receiving an account operation request and identity identification information sent by a terminal device of the user; querying account information corresponding to the identity identification information in response to the account operation request; sending a first display instruction to the terminal device when the account information is found, so that the terminal device displays an account operation interface for the account operation request, where the account operation interface is used to receive account operation interaction data of the user and an identity credential corresponding to the identity identification information.

18 Claims, 12 Drawing Sheets

User terminal device

Customer service terminal device

Server

(58) Field of Classification Search
USPC .............................................................. 726/7
See application file for complete search history.

(56) References Cited

U.S. PATENT DOCUMENTS

| | | | |
|---|---|---|---|
| 2019/0325130 A1* | 10/2019 | Jayaraman | ............ H04L 63/102 |
| 2020/0242232 A1* | 7/2020 | Machani | ............. H04L 63/0861 |
| 2020/0252382 A1* | 8/2020 | Peddada, IV | ......... H04L 63/166 |

FOREIGN PATENT DOCUMENTS

| | | |
|---|---|---|
| CN | 105577664 | 5/2016 |
| CN | 106453245 | 2/2017 |
| CN | 106487789 | 3/2017 |
| CN | 107172087 | 9/2017 |
| CN | 108418808 A | 8/2018 |
| CN | 108460272 | 8/2018 |
| CN | 110445760 | 11/2019 |

OTHER PUBLICATIONS

Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.

\* cited by examiner

SECURE ACCOUNT MODIFICATION

CROSS-REFERENCE TO RELATED APPLICATIONS

This application is a continuation of PCT Application No. PCT/CN2020/071789, filed on Jan. 13, 2020, which claims priority to Chinese Patent Application No. 201910618573.3, filed on Jul. 10, 2019, and each application is hereby incorporated by reference in its entirety.

TECHNICAL FIELD

One or more implementations of the present specification relate to the field of information processing technologies, and in particular, to information processing methods, apparatuses, and devices, and computer readable storage mediums.

BACKGROUND

Currently, an existing account information modification method of application software and a website is usually as follows: After a user calls a manual customer service, the manual customer service sends an interaction link of a fifth-generation Hypertext Markup Language (HTML5) page used to modify account information to a specified communication account provided by the user. After inputting the HTML5 page corresponding to the interaction link, the user needs to first apply for account information modification, and the user can modify account information only when the account information modification application passes audit.

In this account information modification method, an account information modification period is relatively long and account information modification efficiency is relatively low. In addition, the interaction link usually has time validity. When a valid time expires, the user needs to re-apply for a new interaction link, which is prone to reduce use experience of the user. Moreover, if the specified communication account of the user is used by other people, security of the account information is also reduced.

SUMMARY

One or more implementations of the present specification provide information processing methods, apparatuses, and devices, and computer readable storage mediums, so that a user can simply and quickly perform an account operation, thereby improving account operation efficiency and account information security.

Technical solutions provided in one or more implementations of the present specification are as follows:

According to a first aspect, an information processing method is provided, including: when a user is in a non-login state, receiving an account operation request and identity identification information sent by a terminal device of the user; querying account information corresponding to the identity identification information in response to the account operation request; and sending a first display instruction to the terminal device when the account information is found, so that the terminal device displays an account operation interface for the account operation request, where the account operation interface is used to receive account operation interaction data of the user and an identity credential corresponding to the identity identification information.

According to a second aspect, an information processing method is provided, including: when a user is in a non-login state, obtaining an account operation request and identity identification information of the user; sending the account operation request and the identity identification information to a target device; receiving a first display instruction sent by the target device when the target device finds account information; and displaying an account operation interface for the account operation request in response to the first display instruction, where the account operation interface is used to receive account operation interaction data of the user and an identity credential corresponding to the identity identification information.

According to a third aspect, an information processing apparatus is provided, including: a first information receiving module, configured to: when a user is in a non-login state, receive an account operation request and identity identification information sent by a terminal device of the user; an account information query module, configured to query account information corresponding to the identity identification information in response to the account operation request; and a first instruct sending module, configured to send a first display instruction to the terminal device when the account information is found, so that the terminal device displays an account operation interface for the account operation request, where the account operation interface is used to receive account operation interaction data of the user and an identity credential corresponding to the identity identification information.

According to a fourth aspect, an information processing apparatus is provided, including: a first information acquisition module, configured to: when a user is in a non-login state, obtain an account operation request and identity identification information of the user; a first information sending module, configured to send the account operation request and the identity identification information to a target device; a display instruction receiving module, configured to receive a first display instruction sent by the target device when the target device finds account information; and an operation interface display module, configured to display an account operation interface for the account operation request in response to the first display instruction, where the account operation interface is used to receive account operation interaction data of the user and an identity credential corresponding to the identity identification information.

According to a fifth aspect, an information processing device is provided, where the device includes a processor and a memory storing a computer program instruction; and when executing the computer program instruction, the processor implements the information processing method according to the first aspect or the second aspect.

According to a sixth aspect, a computer readable storage medium is provided, where the computer readable storage medium stores a computer program instruction, and when the computer program instruction is executed by a processor, the information processing method according to the first aspect or the second aspect is implemented.

In the one or more of the implementations of the present specification, the account operation request and the identity identification information of the user can be directly received when the user is in the non-login state, and the account information corresponding to the identity identification information is queried in response to the account operation request, so that when the account information is found, the terminal device directly displays the account operation interface for the account operation request to receive the account operation interaction data of the user and the identity credential corresponding to the identity identification information. Therefore, the account operation request, the account operation interaction data, and the identity credential of the user are simply and quickly obtained to complete an account operation corresponding to the account operation request without separately sending an interaction link to the user. As such, the account operation of the user has relatively high efficiency and a relatively short period, and security of the account information of the user is improved, thereby improving use experience of the user.

BRIEF DESCRIPTION OF DRAWINGS

To describe the technical solutions of one or more implementations of the present specification more clearly, the following briefly describes the accompanying drawings required for describing the one or more implementations of the present specification. A person of ordinary skill in the can still derive other accompanying drawings based on these accompanying drawings without creative efforts.

DESCRIPTION OF IMPLEMENTATIONS

The following describes in detail features and example implementations of aspects of the present specification. To make objectives, technical solutions, and advantages of the present specification clearer, the following further describes the present specification in detail with reference to the accompanying drawings and specific implementations. It should be understood that the described implementations are merely some rather than all of the implementations of the present specification. A person skilled in the art can implement the present specification without some of these specific details. The following descriptions of the implementations are merely intended to provide a better understanding of the present specification by illustrating examples of the present specification.

It is worthwhile to note that in the present specification, the relationship terms such as "first" and "second" are merely used to distinguish one entity or operation from another entity or operation, and do not necessarily require or imply that any such actual relationship or sequence exists between these entities or operations. In addition, the terms "include", "contain", or their any other variants are intended to cover a non-exclusive inclusion, so that a process, a method, an article or a device that includes a list of elements not only includes those elements but also includes other elements which are not expressly listed, or further includes elements inherent to such process, method, article or device. Without more constraints, an element preceded by "includes a . . . " does not preclude the existence of additional identical elements in the process, method, article or device that includes the element.

Figure 1:
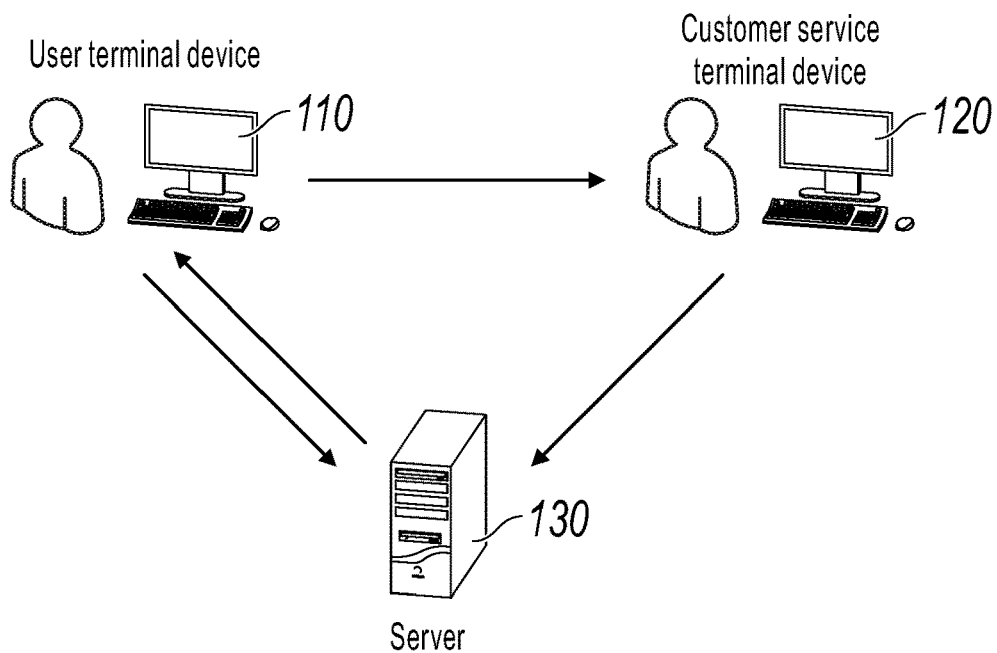
FIG. 1 is a system architecture diagram illustrating an example of an account information modification system in the existing technology.

FIG. 1 is a system architecture diagram illustrating an example of an account information modification system in the existing technology. As shown in FIG. 1, the account information modification system includes a user terminal device 110, a customer service terminal device 120, and a financial application software or a financial website server 130.

For example, a user forgets a login verification password of the financial application software or an account of the financial application software is stolen, resulting in that the account cannot be logged in is used as an example. In this case, after the user calls a manual customer service, the manual customer server can use the customer service terminal device 120 to send, by using the server 130, an interaction link of an HTML5 page used to modify account information to a specified mailbox account provided by the user. After clicking the interaction link on the user terminal device 110, the user can input the HTML5 page by using the user terminal device 110. Then the user needs to first input an account information modification application by using the HTML5 page. After obtaining the account information modification application, the user terminal device 110 sends the account information modification application to the server 130. After the server 130 determines that the account information modification application passes audit, the server 130 sends notification information indicating that the account information modification application passes audit to the specified mailbox account. The user can modify the account information based on the notification information by using the user terminal device 110.

It can be seen that in this account information modification method, an account information modification period is relatively long, and account information modification efficiency is relatively low. In addition, the interaction link usually has time validity. When a valid time expires, the user needs to re-apply for a new interaction link, which is prone to reduce use experience of the user. In addition, if the specified mailbox account of the user is used by other people, other people can also modify the account information of the user by using the specified mailbox account, reducing security of the account information of the user.

Therefore, to solve the existing technical problem, one or more implementations of the present specification provide information processing methods, apparatuses, and devices, and computer readable storage mediums. The information processing method provided in the present specification is first described below.

Figure 2:
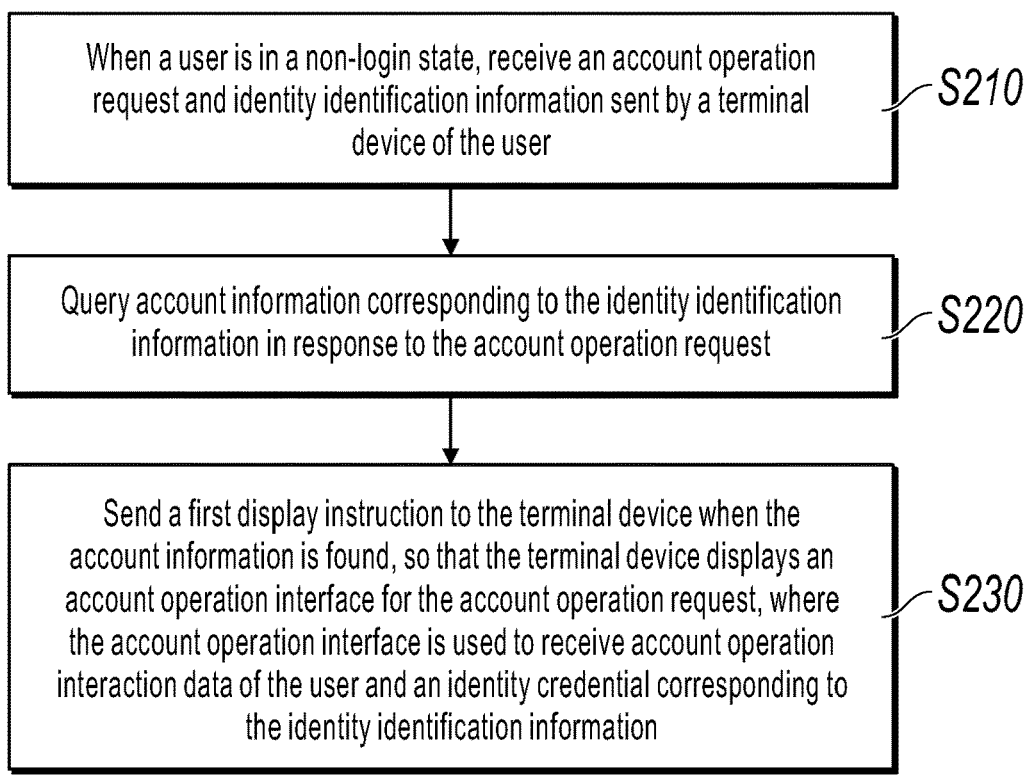
FIG. 2 is a schematic flowchart illustrating an information processing method, according to an implementation of the present specification.

FIG. 2 is a schematic flowchart illustrating an information processing method, according to an implementation of the present specification. As shown in FIG. 2, the information processing method can be applied to the server 130 shown in FIG. 1. The method can specifically include the following steps:

S210. When a user is in a non-login state, receive an account operation request and identity identification information sent by a terminal device of the user.

S220. Query account information corresponding to the identity identification information in response to the account operation request.

S230. Send a first display instruction to the terminal device when the account information is found, so that the terminal device displays an account operation interface for the account operation request, where the account operation interface is used to receive account operation interaction data of the user and an identity credential corresponding to the identity identification information.

In this implementation of the present specification, the server can directly receive the account operation request and the identity identification information of the user when the user is in the non-login state, and query the account information corresponding to the identity identification information in response to the account operation request, so that when the account information is found, the terminal device directly displays the account operation interface for the account operation request to receive the account operation interaction data of the user and the identity credential corresponding to the identity identification information. Therefore, the account operation request, the account operation interaction data, and the identity credential of the user are simply and quickly obtained to complete an account operation corresponding to the account operation request, and the user does not need to call a manual customer service to apply for an interaction link and the interaction link does not need to be separately sent to the user by using the server. As such, the account operation of the user has relatively high efficiency and a relatively short period, and security of the account information of the user is improved, thereby improving use experience of the user.

In this implementation of the present specification, the terminal device can be specifically a mobile phone, a tablet computer, a personal computer, etc. The server can be a high-performance electronic calculator configured to store and process data, and can exchange data with the terminal device.

In this implementation of the present specification, the account of the user is in a login failure state in any one of the following cases: the user forgets login verification information in the account information; the user losses a bound communication account in the account information; the account is restricted from login due to illegal login; the account is stolen; and the account has another problem causing a login failure.

When the account of the user cannot be logged in, the user needs to perform a corresponding account operation on the account. For example, when the user forgets the login verification information in the account information, the user needs to reset new login verification information. When the user loses the bound communication account in the account information, the user needs to reset a new bound communication account. When the account is restricted from login due to illegal login, the user needs to apply for account restriction release. When the account is stolen, the user needs to reset new login verification information and a new bound communication account. When the account has another problem causing a login failure, the user needs to feed back account exception information to request to solve an exception problem corresponding to the account exception information, so that the user can log in to the account.

In step S210 of this implementation of the present specification, when the account of the user is in the login failure state, the server can directly receive the account operation request and the identity identification information sent by the terminal device of the user when the user is in the non-login state.

The account operation request can include at least one of an account information modification request, an account restriction state change request, a problem feedback request, and an account theft appeal request. The identity identification information can be an identity identification number of the user, for example, an identity card number. The identity identification information can be biometric identification information, for example, face information, fingerprint information, or voiceprint information.

Specifically, the terminal device of the user can simultaneously send the account operation request and the identity identification information to the server. In this case, the server can simultaneously receive the account operation request and the identity identification information. The terminal device of the user can separately send the account operation request and the identity identification information to the server in an input sequence of the user. For example, the terminal device first sends the identity identification information and then sends the account operation request, or first sends the account operation request and then sends the identity identification information. In this case, the server can sequentially receive the account operation request and the identity identification information in a sending sequence of the terminal device.

In step S220 of this implementation of the present specification, after receiving the account operation request and the identity identification information, the server can query the account information corresponding to the identity identification information in response to the account operation request.

A query result of querying the account information corresponding to the identity identification information may be that one or more pieces of account information of the user are found, or may be that no account information of the user is found. In this implementation of the present specification, step S230 in this implementation of the present specification is performed only when one or more pieces of account information of the user are found. The information processing method in this implementation of the present specification is terminated when no account information of the user is found.

In step S230 of this implementation of the present specification, if one or more pieces of account information of the user are found, when one piece of account information is found, the server considers by default that the user needs to perform an account operation on the account information; when a plurality of pieces of account information are found, the server can obtain a selection result of the user based on the plurality of pieces of account information, and determine, based on the selection result, account information on which the user performs the account operation.

After determining the account information on which the user needs to perform the account operation, the server can send the first display instruction to the terminal device sending the account operation request. After the terminal device receives the first display instruction, the terminal device can display the account operation interface for the account operation request in response to the first display instruction. The account operation interface is used to receive the account operation interaction data of the user and the identity credential corresponding to the identity identification information.

In some implementations of the present specification, the account information modification request is used to modify login verification information and/or a bound communication account set by the user in the account information. When the account operation request includes the account information modification request, the account operation interaction data can include login verification information and/or a bound communication account updated by the user.

In some other implementations of the present specification, when the account operation request includes the account restriction state change request, the account operation interaction data can include an account restriction release request input by the user.

In still some implementations of the present specification, when the account operation request includes the problem feedback request, the account operation interaction data can include account exception information input by the user.

In yet some implementations of the present specification, when the account operation request includes the account theft appeal request, the account operation interaction data can include user-set login verification information and an account-bound communication account updated by the user.

In this implementation of the present specification, the identity credential can be a credential used to verify the identity identification information. For example, when the identity identification information is an identity card number, the identity credential can be an image of an identity card. When the identity identification information is fingerprint information in biometric identification information, the identity credential can be face information or voiceprint information in the biometric identification information. In addition, in this implementation of the present specification, more diversified identity credentials can be set based on requirements, and a corresponding identity credential input entry is provided to the user.

In this implementation of the present specification, when the account operation request includes the account information modification request, and the account information modification request is only used to modify one of the login verification information and the bound communication account, for example, when the account information modification request is only used to modify the login verification information, the user can still log in to the account by using the bound communication account, and modify the login verification information on an account management page when the user is in a login state.

Therefore, before the first display instruction is sent to the terminal device, the information processing method in this implementation of the present specification can further include: sending a second display instruction to the terminal device, so that the terminal device displays a login operation interface, where the login operation interface is used to receive a state keeping instruction indicating that the user determines to keep in the non-login state or an account login instruction indicating that the user determines to log in to the account.

When the user determines to continue to keep in the non-login state based on the login operation interface, the user can input the state keeping instruction to the terminal device, and the terminal device can send the state keeping instruction to the server, so that the server receives the state keeping instruction.

When the server receives the state keeping instruction, the server can send the first display instruction to the terminal device in response to the state keeping instruction.

However, when the user chooses to input the account login instruction to the terminal device based on the login operation interface, the server does not send the first display instruction to the terminal device.

Therefore, in this implementation of the present specification, in addition to that the user can still perform the account operation on the account information of the user when the user is in the non-login state, an account operation method that the user can perform the account operation on the account management page when the user is in the login state is further provided to the user, thereby improving flexibility of performing the account operation by the user and improving use experience of the user.

Figure 3:
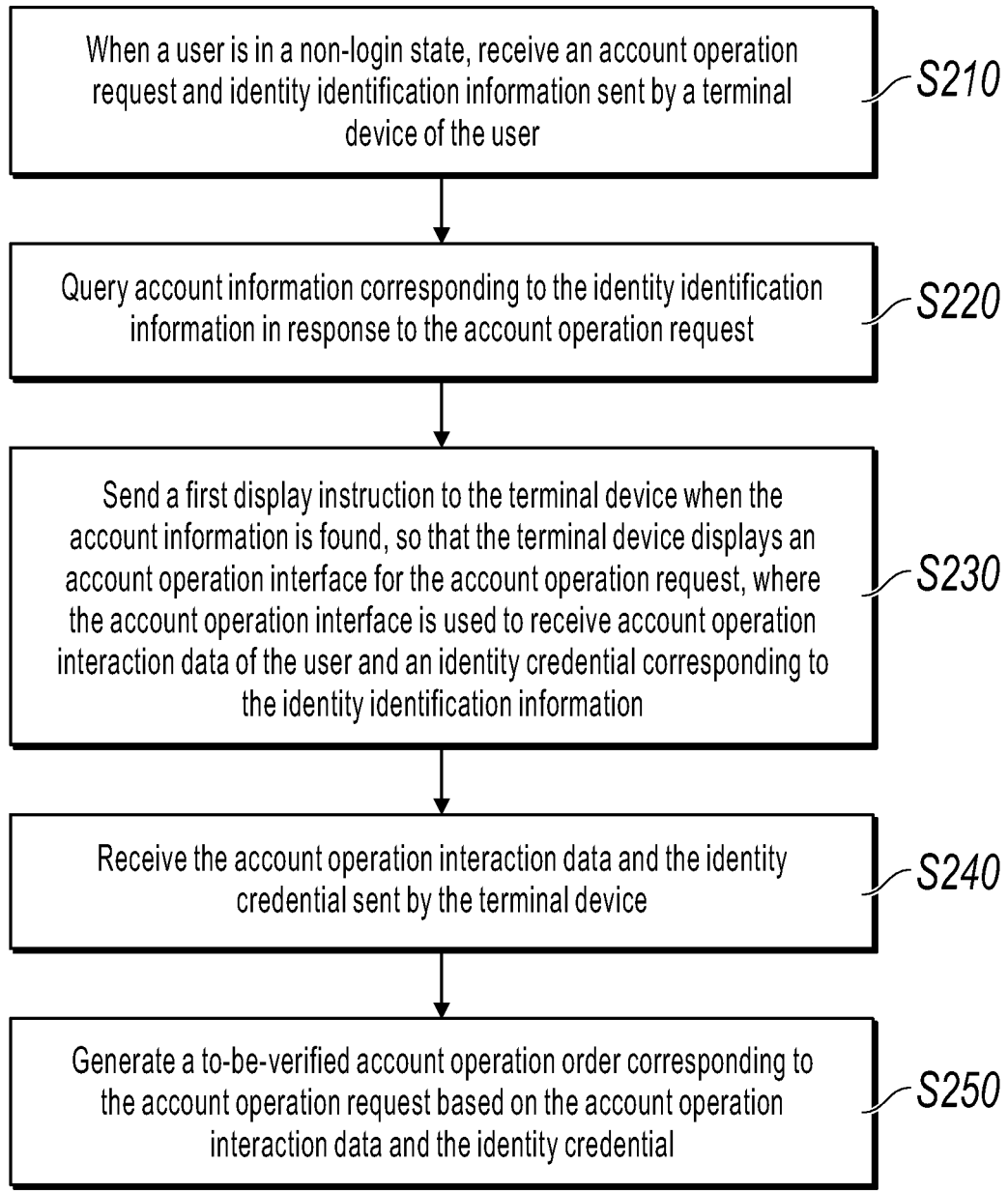
FIG. 3 is a schematic flowchart illustrating an information processing method, according to another implementation of the present specification.

FIG. 3 is a schematic flowchart illustrating an information processing method, according to another implementation of the present specification. As shown in FIG. 3, the information processing method can further include the following steps:

S240. Receive the account operation interaction data and the identity credential sent by the terminal device.

S250. Generate a to-be-verified account operation order corresponding to the account operation request based on the account operation interaction data and the identity credential.

In this implementation of the present specification, after the first display instruction is sent to the terminal device in step S230, when the user inputs the account operation interaction data and the identity credential to the terminal device based on the account operation interface, the terminal device can send the obtained account operation interaction data and identity credential to the server.

In this case, after receiving the account operation interaction data and the identity credential sent by the terminal device, the server can generate the to-be-verified account operation order corresponding to the account operation request based on the account operation interaction data and the identity credential, so as to verify the account operation interaction data and the identity credential input by the user.

In this implementation of the present specification, a specific method for generating the to-be-verified account operation order corresponding to the account operation request based on the account operation interaction data and the identity credential in step S250 can include: determining a security detection result corresponding to the account operation request; and generating the to-be-verified account operation order corresponding to the account operation request based on the account operation interaction data, the identity credential, and the security detection result.

In some implementations of the present specification, the determined security detection result may be that the account operation request is risk-free or in-risk. In some other implementations of the present specification, the determined security detection result may be a security class of the account operation request. Therefore, it is only required that the security detection result can be used to evaluate a risk of performing the account operation corresponding to the account operation request.

The security detection result can also be used when the to-be-verified account operation order is generated, so that the risk of performing the account operation corresponding to the account operation request can be more comprehensively evaluated during verification, reliability of the verification result can be improved, and the risk of performing the account operation corresponding to the account operation request can be reduced, thereby improving security of account information of the user.

In this implementation of the present specification, a specific method for determining the security detection result corresponding to the account operation request can include: receiving terminal information of the terminal device sending the account operation request; and determining the security detection result corresponding to the account operation request based on a result of matching between the terminal information and target terminal information, where the target terminal information includes historical login terminal information and/or blacklisted terminal information corresponding to the account information.

Specifically, the terminal information of the terminal device can include information such as a terminal device identification number, a terminal network address, and a terminal communication account.

When the target terminal information includes the historical login terminal information corresponding to the account information, if the terminal information matches the target terminal information, that is, the terminal information is consistent with the target terminal information, it can be determined that the security detection result corresponding to the account operation request is risk-free. If the terminal information does not match the target terminal information, that is, the terminal information is inconsistent with the target terminal information, it can be determined that the security detection result corresponding to the account operation request is in-risk.

When the target terminal information includes the blacklisted terminal information, if the terminal information matches the blacklisted terminal information of the target terminal information, that is, the terminal information is consistent with the blacklisted terminal information of the target terminal information, it can be determined that the security detection result corresponding to the account operation request is in-risk. If the terminal information does not match the blacklisted terminal information of the target terminal information, that is, the terminal information is inconsistent with the blacklisted terminal information of the target terminal information, it can be determined that the security detection result corresponding to the account operation request is risk-free.

Figure 4:
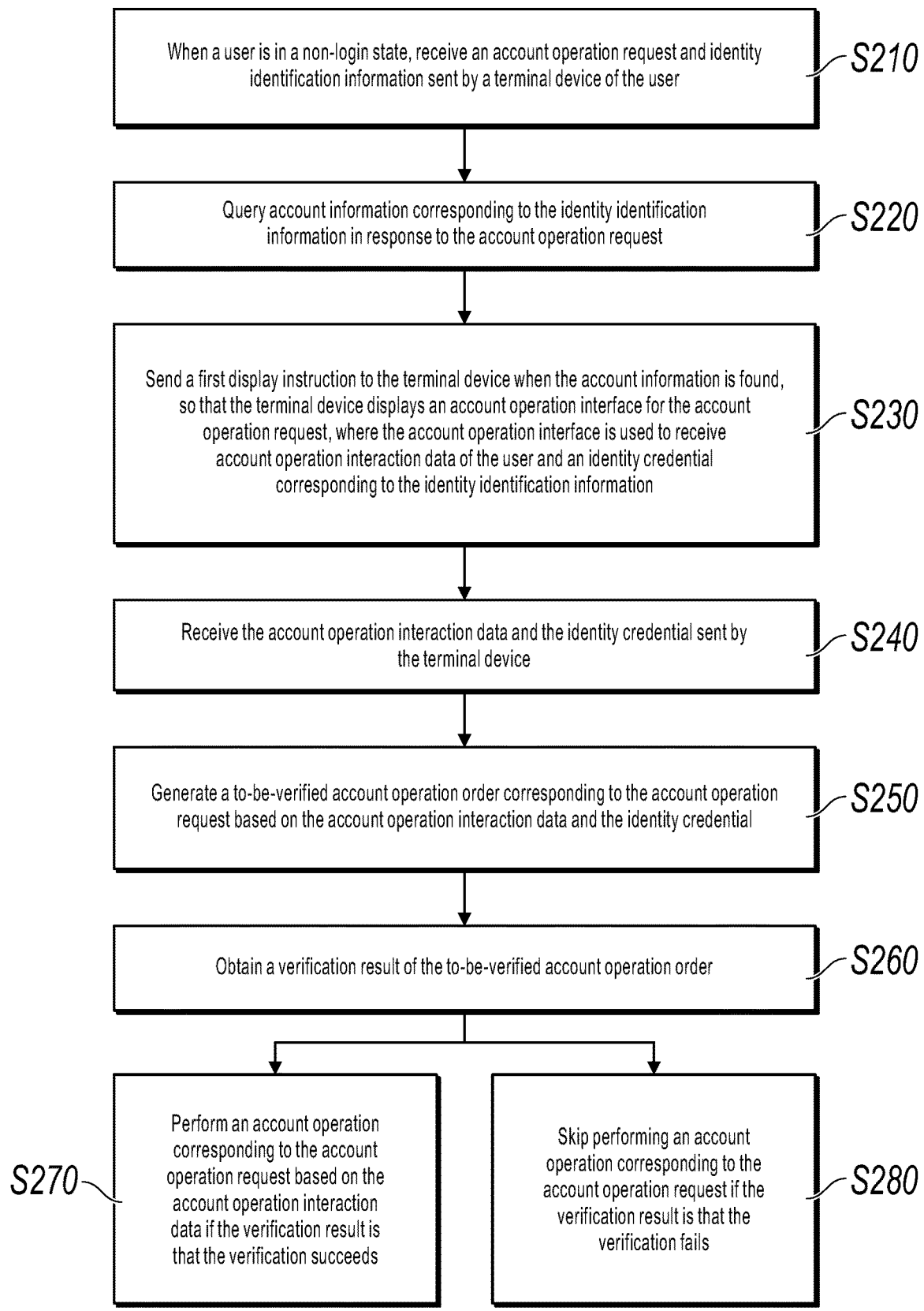
FIG. 4 is a schematic flowchart illustrating an information processing method, according to still another implementation of the present specification.

FIG. 4 is a schematic flowchart illustrating an information processing method, according to another implementation of the present specification. As shown in FIG. 4, the information processing method can further include the following steps:

S260. Obtain a verification result of the to-be-verified account operation order.

S270. Perform an account operation corresponding to the account operation request based on the account operation interaction data if the verification result is that the verification succeeds.

S280. Skip performing an account operation corresponding to the account operation request if the verification result is that the verification fails.

The verification result of the to-be-verified account operation order can be determined by the server, or can be manually determined.

For example, when the user requests to reset new login verification information, if the verification result is that the verification succeeds, the user can directly modify the login verification information in the user information based on the account operation interaction data. When the user requests to reset a new bound communication account, if the verification result is that the verification succeeds, the user can directly modify the bound communication account in the user information based on the account operation interaction data. When the user applies for account restriction release, if the verification result is that the verification succeeds, the user can directly release account restriction based on the account operation interaction data. When the user requests to feed back the account exception information, if the verification result is that the verification succeeds, the user can directly solve the exception problem corresponding to the account exception information based on the account operation interaction data, so that the user can log in to the account.

Figure 5:
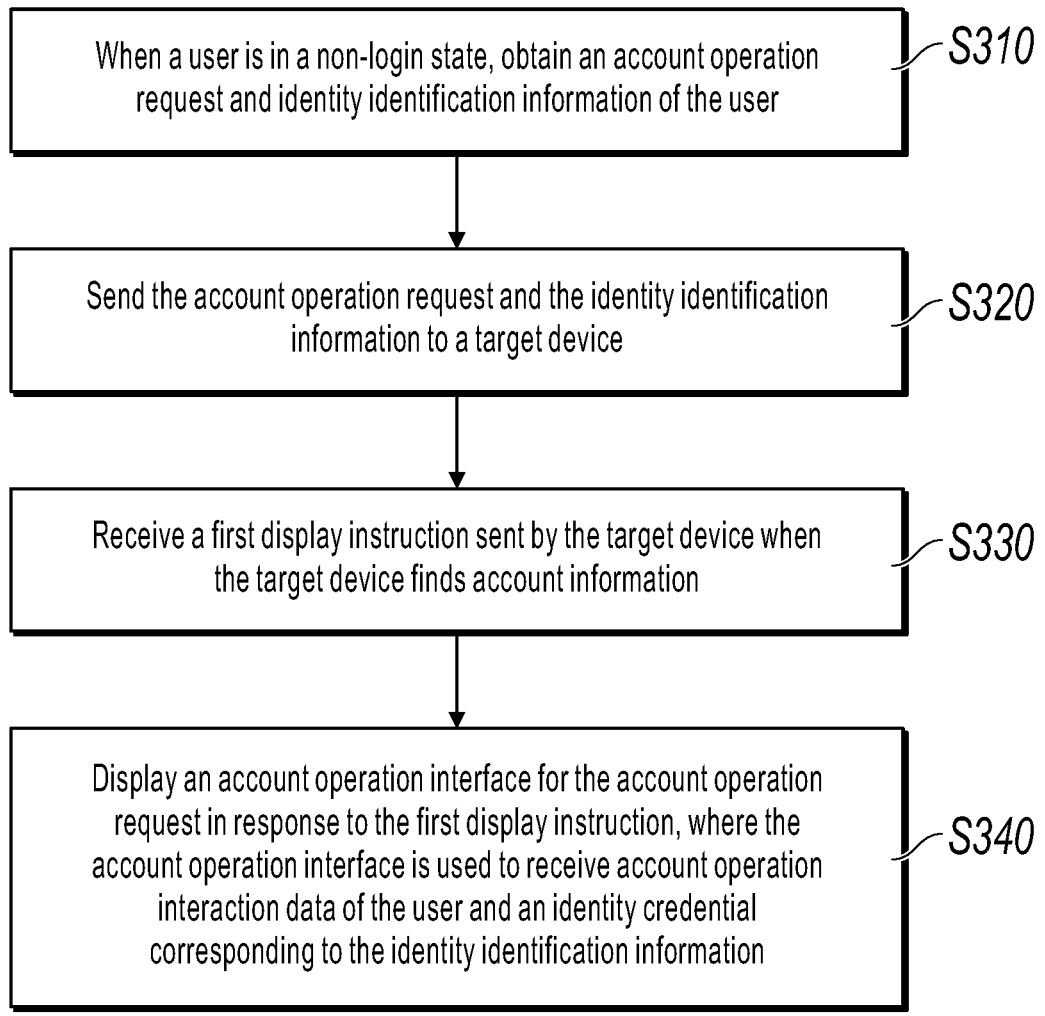
FIG. 5 is a schematic flowchart illustrating an information processing method, according to yet another implementation of the present specification.

FIG. 5 is a schematic flowchart illustrating an information processing method, according to yet another implementation of the present specification. As shown in FIG. 5, the information processing method can be applied to a terminal device. Specifically, the information processing method can be applied to the user terminal device 110 shown in FIG. 1. The method can specifically include the following steps:

S310. When a user is in a non-login state, obtain an account operation request and identity identification information of the user.

S320. Send the account operation request and the identity identification information to a target device.

S330. Receive a first display instruction sent by the target device when the target device finds account information.

S340. Display an account operation interface for the account operation request in response to the first display instruction, where the account operation interface is used to receive account operation interaction data of the user and an identity credential corresponding to the identity identification information.

In this implementation of the present specification, the terminal device can directly obtain the account operation request and the identity identification information of the user when the user is in the non-login state, and send the account operation request and the identity identification information to the target device, so that the target device queries the account information corresponding to the identity identification information in response to the account operation request, and sends the first display instruction to the terminal device when finding the account information; and the terminal device can directly display the account operation interface for the account operation request in response to the first display instruction to receive the account operation interaction data of the user and the identity credential corresponding to the identity identification information. Therefore, the account operation request, the account operation interaction data, and the identity credential of the user are simply and quickly obtained to complete an account operation corresponding to the account operation request, and a manual customer service does not need to separately send an interaction link to the user. As such, the account operation of the user has relatively high efficiency and a relatively short period, and security of the account information of the user is improved, thereby improving use experience of the user.

In step S310 of this implementation of the present specification, when an account of the user is in a login failure state, the user can directly input the account operation request and the identity identification information to the terminal device when the user is in the non-login state.

The account operation request can include at least one of an account information modification request, an account restriction state change request, a problem feedback request, and an account theft appeal request. The identity identification information can be an identity identification number of the user, for example, an identity card number. The identity identification information can be biometric identification information, for example, face information, fingerprint information, or voiceprint information.

Specifically, the terminal device can simultaneously obtain the account operation request and the identity identification information of the user through the same display interface. The terminal device can sequentially obtain the account operation request and the identity identification information of the user through different display interfaces.

When the terminal device sequentially obtains the account operation request and the identity identification information of the user through different display interfaces, in step S310 of this implementation of the present specification, a specific method for obtaining the account operation request and the identity identification information of the user can include: obtaining the account operation request of the user; displaying an information input interface in response to the account operation request, where the information input interface is used to obtain the identity identification information of the user; and obtaining the identity identification information.

In this case, the terminal device can first obtain the account operation request of the user, and then obtain the identity identification information of the user.

In step S320 of this implementation of the present specification, the terminal device can sequentially send the account operation request and the identity identification information to the target device in a sequence of obtaining the account operation request and the identity identification information, or can send the account operation request and the identity identification information to the target device together after obtaining the account operation request and the identity identification information, which is not limited here.

In this implementation of the present specification, the information processing method can further include: obtaining the account operation interaction data and the identity credential input by the user, and sending the account operation interaction data and the identity credential to the target device, so that the target device generates a to-be-verified account operation order corresponding to the account operation request based on the account operation interaction data and the identity credential.

In this implementation of the present specification, the identity credential can be a credential used to verify the identity identification information. For example, when the identity identification information is an identity card number, the identity credential can be an image of an identity card. When the identity identification information is fingerprint information in biometric identification information, the identity credential can be face information or voiceprint information in the biometric identification information. In addition, in this implementation of the present specification, more diversified identity credentials can be set based on requirements, and a corresponding identity credential input entry is provided to the user.

In some implementations of the present specification, the account information modification request is used to modify login verification information and/or a bound communication account set by the user in the account information. When the account operation request includes the account information modification request, the account operation interaction data can include login verification information and/or a bound communication account updated by the user.

In some other implementations of the present specification, when the account operation request includes the account restriction state change request, the account operation interaction data can include an account restriction release request input by the user.

In still some implementations of the present specification, when the account operation request includes the problem feedback request, the account operation interaction data can include account exception information input by the user.

In yet some implementations of the present specification, when the account operation request includes the account theft appeal request, the account operation interaction data can include user-set login verification information and an account-bound communication account updated by the user.

Figure 6A:
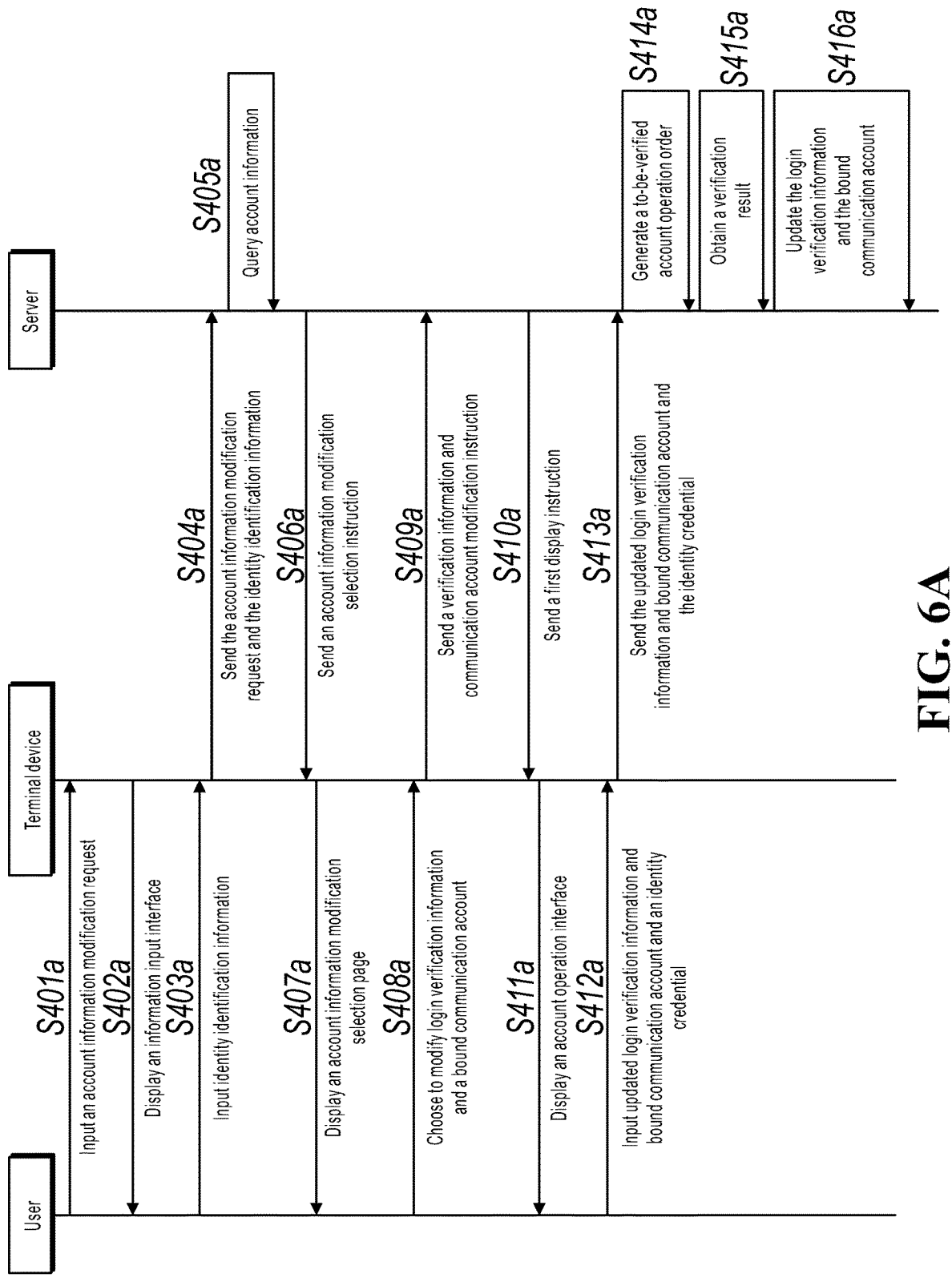
FIG. 6a to FIG. 6d are schematic flowcharts illustrating account information modification interaction methods in different cases, according to an implementation of the present specification.

FIG. 6a is a schematic flowchart illustrating an account information modification interaction method, according to an implementation of the present specification. As shown in FIG. 6a, a specific procedure of the interaction method for modifying login verification information and a bound communication account in this implementation of the present specification can include the following steps:

S401a. A user clicks a button for retrieving user information in a user login interface of application software of a terminal device, and inputs an account information modification request to the terminal device.

S402a. The terminal device receives the account information modification request, and jumps to an information input interface displaying the application software.

S403a. The user inputs identity identification information in the information input interface of the terminal device.

S404a. After receiving the identity identification information, the terminal device sends the account information modification request and the identity identification information to a server.

S405a. After receiving the account information modification request and the identity identification information, the server queries account information corresponding to the identity identification information.

S406a. When finding the account information, the server sends an account information modification selection instruction to the terminal device.

S407a. After receiving the account information modification selection instruction, the terminal device displays an account information modification selection page of the application software.

S408a. The user chooses to modify the login verification information and the bound communication account based on the account information modification selection page.

S409a. The terminal device generates a verification information and communication account modification instruction, and sends the verification information and communication account modification instruction to the server.

S410a. After receiving the verification information and communication account modification instruction, the server sends a first display instruction to the terminal device.

S411a. The terminal device displays, in response to the first display instruction, an account operation interface of the application software that is used to receive login verification information and bound communication account updated by the user and an identity credential.

S412a. The user inputs the updated login verification information and bound communication account and the identity credential to the terminal device based on the account operation interface.

S413a. The terminal device obtains the updated login verification information and bound communication account and the identity credential, and sends the updated login verification information and bound communication account and the identity credential to the server.

S414a. The server generates a to-be-verified account operation order based on the updated login verification information and bound communication account, the identity credential, and a security detection result of an account operation request.

S415a. The server obtains a verification result of the to-be-verified account operation order.

S416a. When the verification result is that the verification succeeds, the server updates the login verification information and the bound communication account in the account information.

Figure 6B:
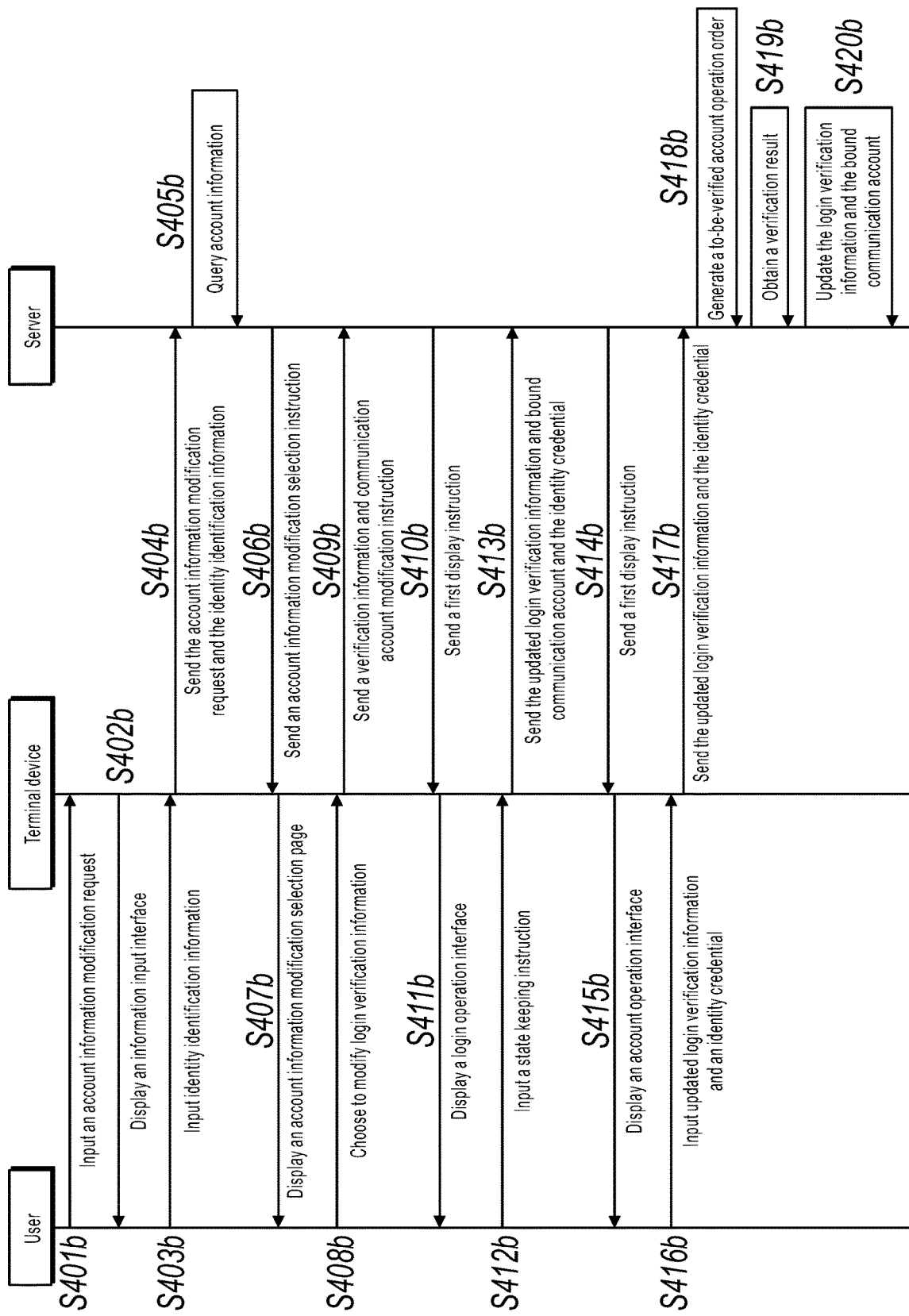

FIG. 6b is a schematic flowchart illustrating an account information modification interaction method, according to another implementation of the present specification. As shown in FIG. 6b, a specific procedure of the interaction method for modifying login verification information in this implementation of the present specification can include the following steps:

S401b. A user clicks a button for retrieving user information in a user login interface of application software of a terminal device, and inputs an account information modification request to the terminal device.

S402b. The terminal device receives the account information modification request, and jumps to an information input interface displaying the application software.

S403b. The user inputs identity identification information in the information input interface of the terminal device.

S404b. After receiving the identity identification information, the terminal device sends the account information modification request and the identity identification information to a server.

S405b. After receiving the account information modification request and the identity identification information, the server queries account information corresponding to the identity identification information.

S406b. When finding the account information, the server sends an account information modification selection instruction to the terminal device.

S407b. After receiving the account information modification selection instruction, the terminal device displays an account information modification selection page of the application software.

S408b. The user chooses to modify the login verification information based on the account information modification selection page.

S409b. The terminal device generates a verification information modification instruction, and sends the verification information modification instruction to the server.

S410b. After receiving the verification information modification instruction, the server sends a second display instruction to the terminal device.

S411b. The terminal device displays a login operation interface of the application software in response to the second display instruction, to notify that the user can log in to an account by using a bound communication account.

S412b. The user clicks, based on the login operation interface, a state keeping button used to instruct to log in to the account without using the bound communication account, so as to input a state keeping instruction to the terminal device.

S413b. The terminal device sends the state keeping instruction to the server.

S414b. After receiving the state keeping instruction, the server sends a first display instruction to the terminal device.

S415b. The terminal device displays, in response to the first display instruction, an account operation interface of the application software that is used to receive login verification information updated by the user and an identity credential.

S416b. The user inputs the updated login verification information and the identity credential to the terminal device based on the account operation interface.

S417b. The terminal device obtains the updated login verification information and the identity credential, and sends the updated login verification information and the identity credential to the server.

S418b. The server generates a to-be-verified account operation order based on the updated login verification information, the identity credential, and a security detection result of an account operation request.

S419b. The server obtains a verification result of the to-be-verified account operation order.

S420b. When the verification result is that the verification succeeds, the server updates the login verification information in the account information.

Figure 6C:
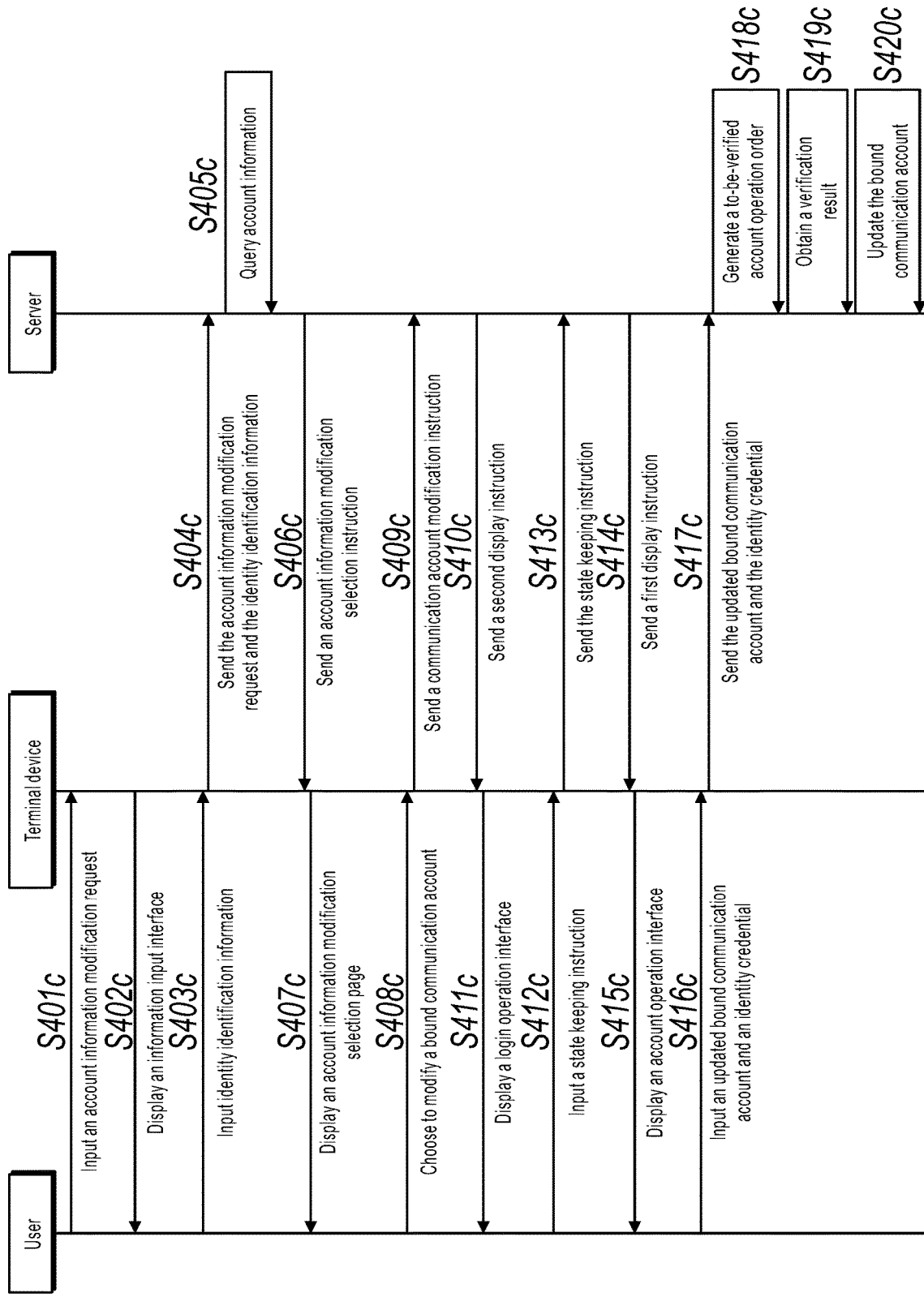

FIG. 6c is a schematic flowchart illustrating an account information modification interaction method, according to still another implementation of the present specification. As shown in FIG. 6c, a specific procedure of the interaction method for modifying a bound communication account in this implementation of the present specification can include the following steps:

S401c. A user clicks a button for retrieving user information in a user login interface of application software of a terminal device, and inputs an account information modification request to the terminal device.

S402c. The terminal device receives the account information modification request, and jumps to an information input interface displaying the application software.

S403c. The user inputs identity identification information in the information input interface of the terminal device.

S404c. After receiving the identity identification information, the terminal device sends the account information modification request and the identity identification information to a server.

S405c. After receiving the account information modification request and the identity identification information, the server queries account information corresponding to the identity identification information.

S406c. When finding the account information, the server sends an account information modification selection instruction to the terminal device.

S407c. After receiving the account information modification selection instruction, the terminal device displays an account information modification selection page of the application software.

S408c. The user chooses to modify the bound communication account based on the account information modification selection page.

S409c. The terminal device generates a communication account modification instruction, and sends the communication account modification instruction to the server.

S410c. After receiving the communication account modification instruction, the server sends a second display instruction to the terminal device.

S411c. The terminal device displays a login operation interface of the application software in response to the second display instruction, to notify that the user can log in to an account by using login verification information.

S412c. The user clicks, based on the login operation interface, a state keeping button used to instruct to log in to the account without using the login verification information, so as to input a state keeping instruction to the terminal device.

S413c. The terminal device sends the state keeping instruction to the server.

S414c. After receiving the state keeping instruction, the server sends a first display instruction to the terminal device.

S415c. The terminal device displays, in response to the first display instruction, an account operation interface of the application software that is used to receive bound communication account updated by the user and an identity credential.

S416c. The user inputs the updated bound communication account and the identity credential to the terminal device based on the account operation interface.

S417c. The terminal device obtains the updated bound communication account and the identity credential, and sends the updated bound communication account and the identity credential to the server.

S418c. The server generates a to-be-verified account operation order based on the updated bound communication account, the identity credential, and a security detection result of an account operation request.

S419c. The server obtains a verification result of the to-be-verified account operation order.

S420c. When the verification result is that the verification succeeds, the server updates the bound communication account in the account information.

Figure 6D:
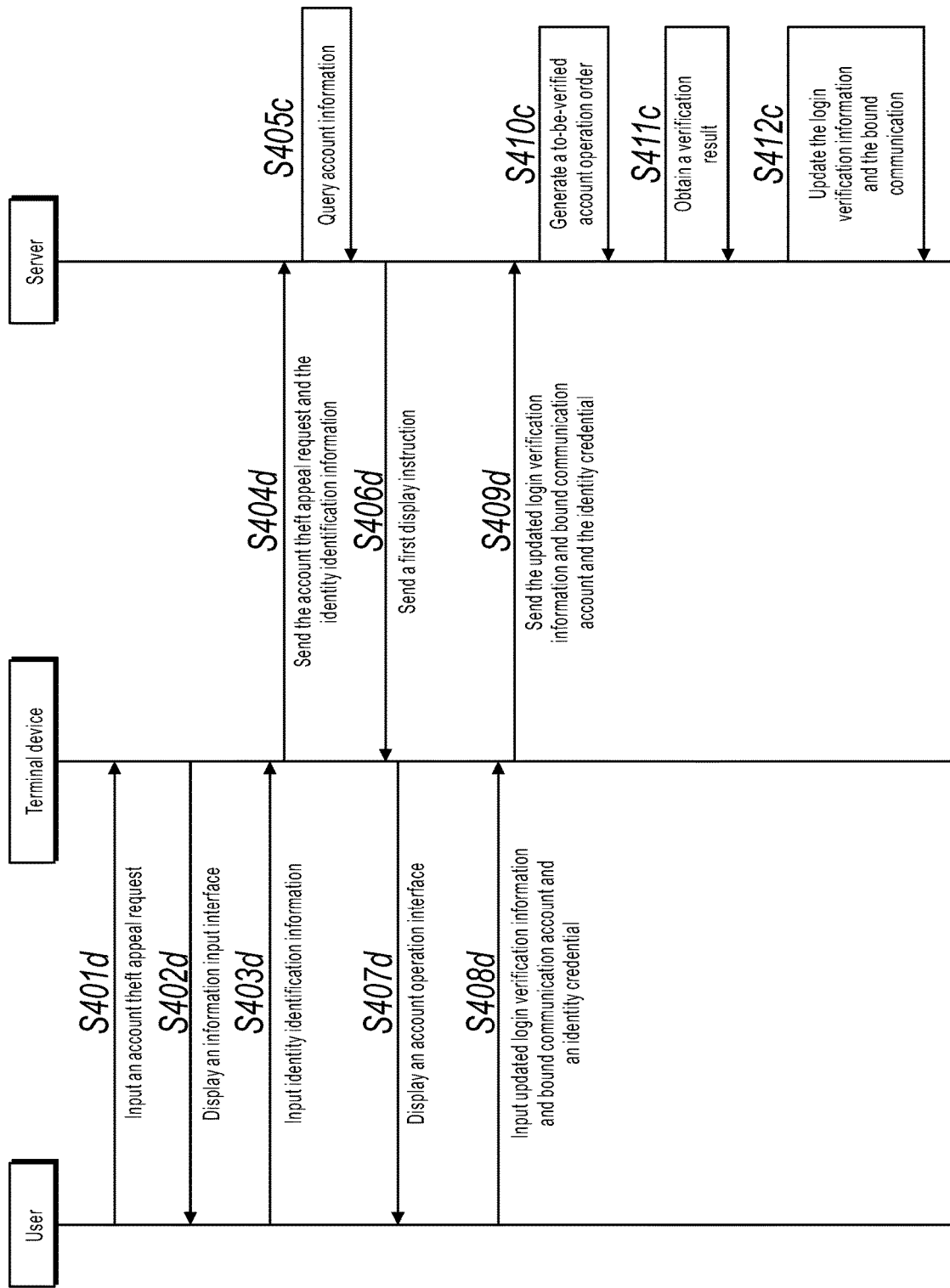

FIG. 6d is a schematic flowchart illustrating an account information modification interaction method, according to yet another implementation of the present specification. As shown in FIG. 6d, a specific procedure of the interaction method for modifying login verification information and a bound communication account in this implementation of the present specification can include the following steps:

S401d. A user clicks an account theft appeal button in a user login interface of application software of a terminal device, and inputs an account theft appeal request to the terminal device.

S402d. The terminal device receives the account theft appeal request, and jumps to an information input interface displaying the application software.

S403d. The user inputs identity identification information in the information input interface of the terminal device.

S404d. After receiving the identity identification information, the terminal device sends the account theft appeal request and the identity identification information to a server.

S405d. After receiving the account theft appeal request and the identity identification information, the server queries account information corresponding to the identity identification information.

S406d. When finding the account information, the server sends a first display instruction to the terminal device.

S407d. The terminal device displays, in response to the first display instruction, an account operation interface of the application software that is used to receive login verification information and bound communication account updated by the user and an identity credential, and displays, in the account operation interface, prompt information guiding the user to make a police call.

S408d. The user inputs the updated login verification information and bound communication account and the identity credential to the terminal device based on the account operation interface.

S409d. The terminal device obtains the updated login verification information and bound communication account and the identity credential, and sends the updated login verification information and bound communication account and the identity credential to the server.

S410d. The server generates a to-be-verified account operation order based on the updated login verification information and bound communication account, the identity credential, and a security detection result of an account operation request.

S411d. The server obtains a verification result of the to-be-verified account operation order.

S412d. When the verification result is that the verification succeeds, the server updates the login verification information and the bound communication account in the account information.

Figure 7:
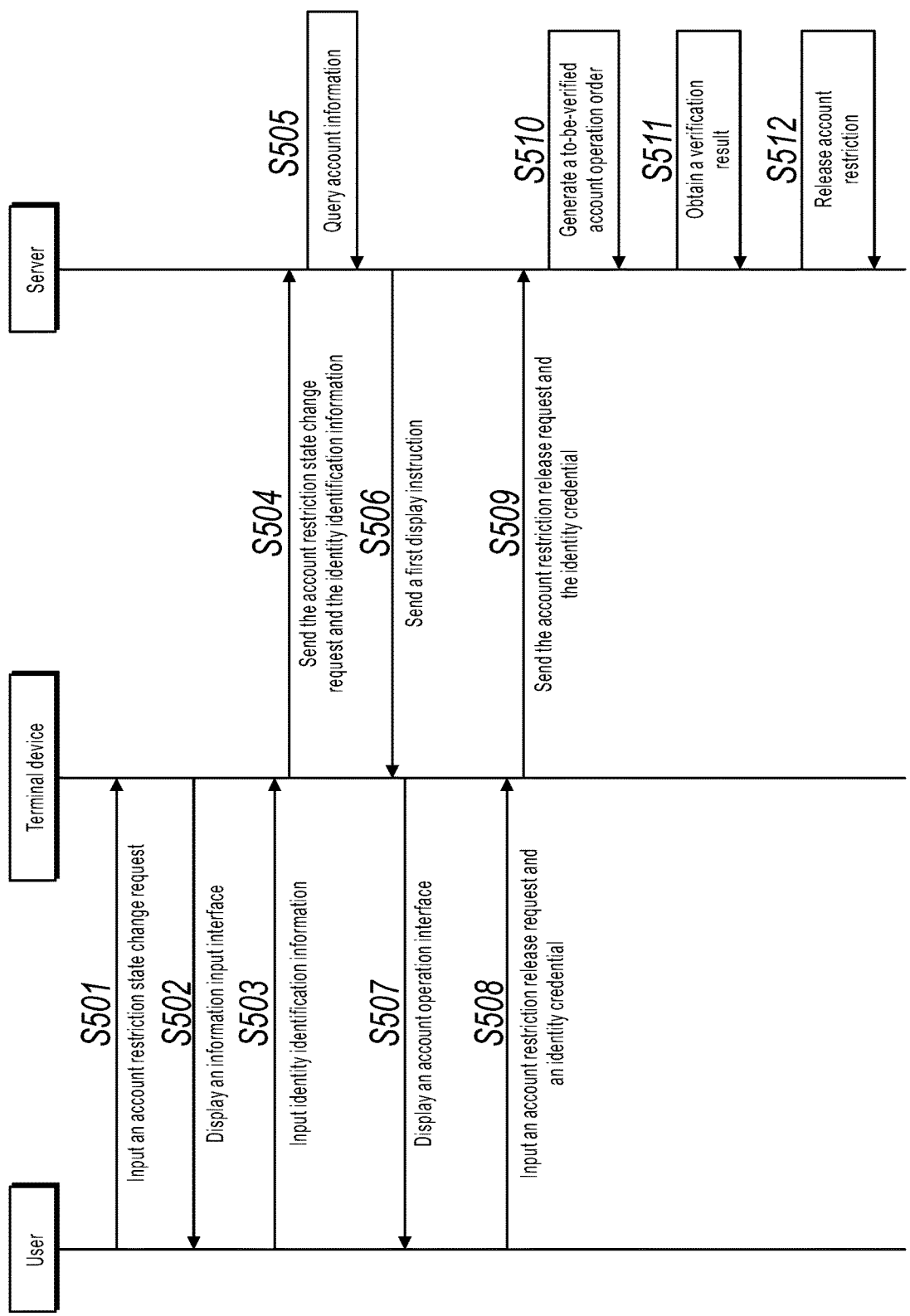
FIG. 7 is a schematic flowchart illustrating an account restriction release interaction method, according to an implementation of the present specification.

FIG. 7 is a schematic flowchart illustrating an account restriction release interaction method, according to an implementation of the present specification. As shown in FIG. 7, a specific procedure of the account restriction release interaction method in this implementation of the present specification can include the following steps:

S501. A user clicks a button for submitting an account restriction state change request in a user login interface of application software of a terminal device, and inputs the account restriction state change request to the terminal device.

S502. The terminal device receives the account restriction state change request, and jumps to an information input interface displaying the application software.

S503. The user inputs identity identification information in the information input interface of the terminal device.

S504. After receiving the identity identification information, the terminal device sends the account restriction state change request and the identity identification information to a server.

S505. After receiving the account restriction state change request and the identity identification information, the server queries account information corresponding to the identity identification information.

S506. When finding the account information, the server sends a first display instruction to the terminal device.

S507. The terminal device displays, in response to the first display instruction, an account operation interface of the application software that is used to receive an account restriction release request and an identity credential submitted by the user.

S508. The user clicks an account restriction release request submission button based on the account operation interface, and inputs the identity credential to the terminal device.

S509. The terminal device obtains the account restriction release request and the identity credential, and sends the account restriction release request and the identity credential to the server.

S510. The server generates a to-be-verified account operation order based on the account restriction release request, the identity credential, and a security detection result of an account operation request.

S511. The server obtains a verification result of the to-be-verified account operation order.

S512. When the verification result is that the verification succeeds, the server releases account restriction on the account information.

Figure 8:
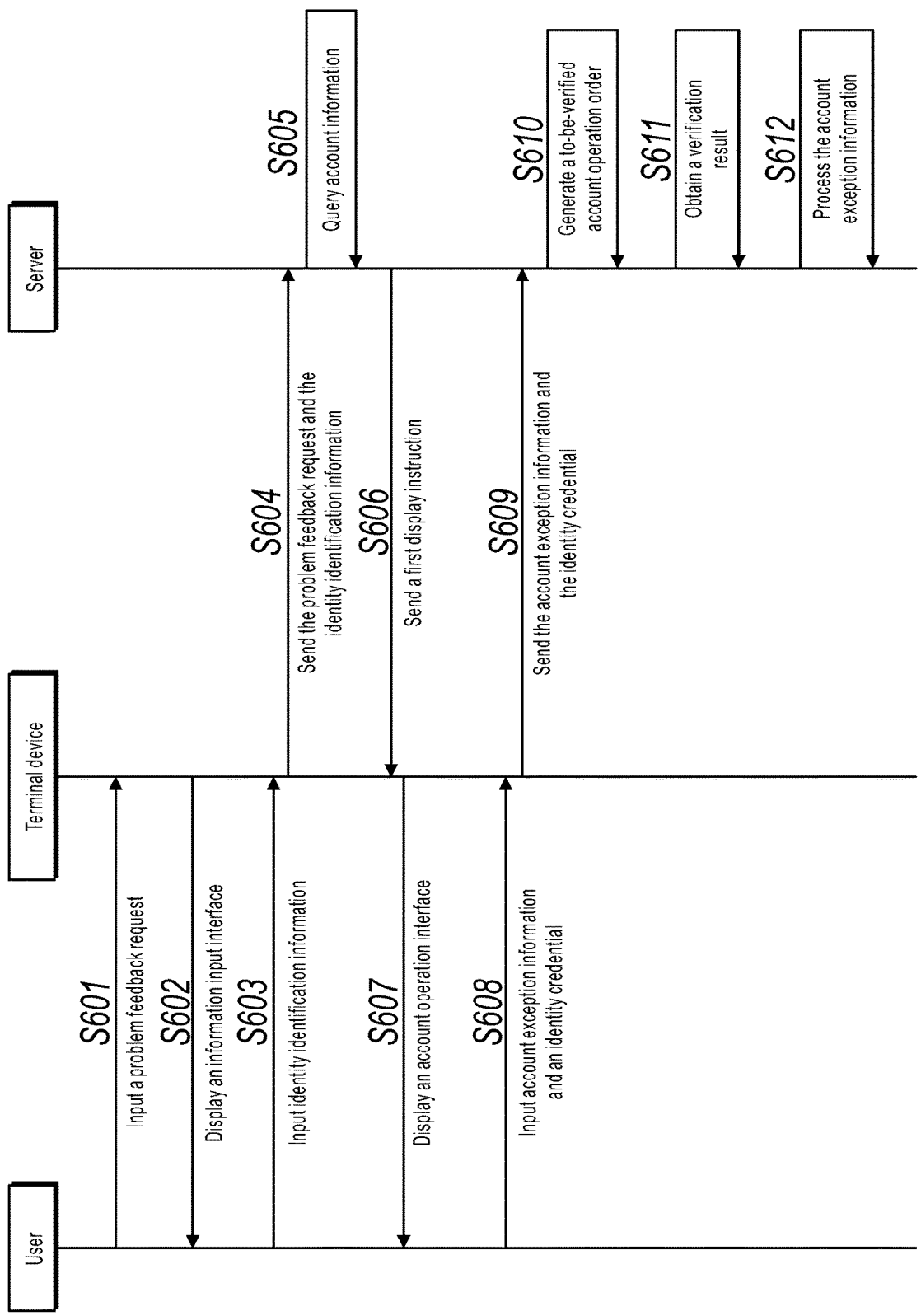
FIG. 8 is a schematic flowchart illustrating an account problem feedback interaction method, according to an implementation of the present specification.

FIG. 8 is a schematic flowchart illustrating an account problem feedback interaction method, according to an implementation of the present specification. As shown in FIG. 8, the method includes the following steps:

S601. A user clicks a button for submitting a problem feedback request in a user login interface of application software of a terminal device, and inputs the problem feedback request to the terminal device.

S602. The terminal device receives the problem feedback request, and jumps to an information input interface displaying the application software.

S603. The user inputs identity identification information in the information input interface of the terminal device.

S604. After receiving the identity identification information, the terminal device sends the problem feedback request and the identity identification information to a server.

S605. After receiving the problem feedback request and the identity identification information, the server queries account information corresponding to the identity identification information.

S606. When finding the account information, the server sends a first display instruction to the terminal device.

S607. The terminal device displays, in response to the first display instruction, an account operation interface of the application software that is used to receive account exception information and an identity credential input by the user.

S608. The user inputs the account exception information and the identity credential to the terminal device based on the account operation interface.

S609. The terminal device obtains the account exception information and the identity credential, and sends the account exception information and the identity credential to the server.

S610. The server generates a to-be-verified account operation order based on the account exception information, the identity credential, and a security detection result of an account operation request.

S611. The server obtains a verification result of the to-be-verified account operation order.

S612. When the verification result is that the verification succeeds, the server processes the account exception information.

In conclusion, in the information processing method provided in one or more implementations of the present specification, when the user performs the account operation on the account information, a manual customer service does not need to separately send an interaction link to the user. Instead, the user can directly submit the account operation request, the identity identification information, the account operation interaction data, and the identity credential in a display interface of the application software, etc. After verification of the to-be-verified account operation order corresponding to the account operation request succeeds, the user directly performs the account operation corresponding to the account operation request by using the server, thereby saving costs of performing the account operation on the account information by the user, improving account operation efficiency, and improving security of the account information.

Figure 9:
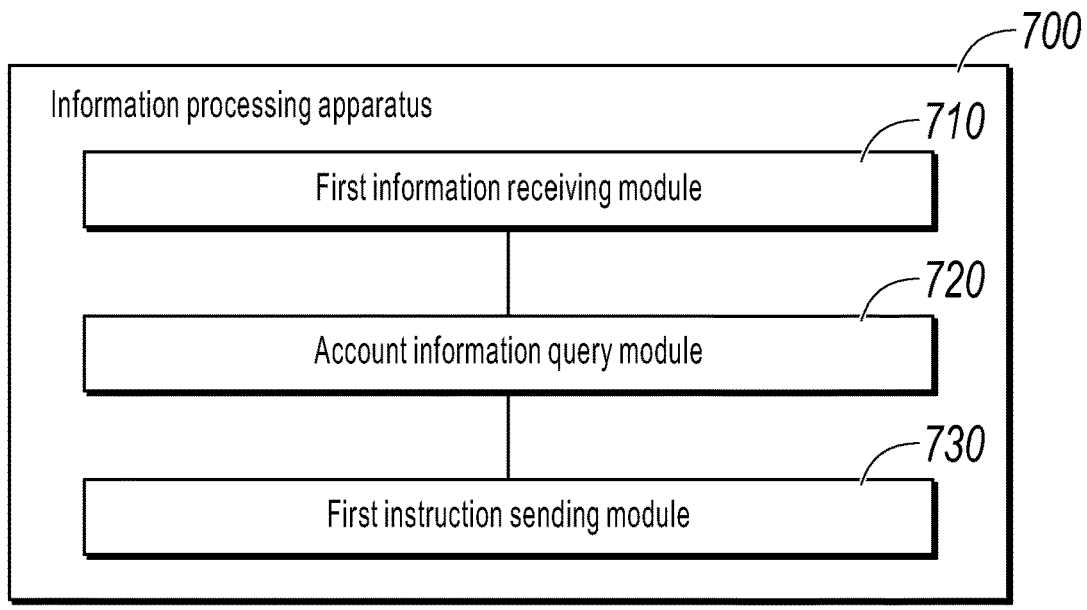
FIG. 9 is a schematic structural diagram illustrating an information processing apparatus, according to an implementation of the present specification.

FIG. 9 is a schematic structural diagram illustrating an information processing apparatus, according to an implementation of the present specification. As shown in FIG. 9, the information processing apparatus 700 applied to a server includes: a first information receiving module 710, configured to: when a user is in a non-login state, receive an account operation request and identity identification information sent by a terminal device of the user; an account information query module 720, configured to query account information corresponding to the identity identification information in response to the account operation request; and a first instruct sending module 730, configured to send a first display instruction to the terminal device when the account information is found, so that the terminal device displays an account operation interface for the account operation request, where the account operation interface is used to receive account operation interaction data of the user and an identity credential corresponding to the identity identification information.

In this implementation of the present specification, the server can directly receive the account operation request and the identity identification information of the user when the user is in the non-login state, and query the account information corresponding to the identity identification information in response to the account operation request, so that when the account information is found, the terminal device directly displays the account operation interface for the account operation request to receive the account operation interaction data of the user and the identity credential corresponding to the identity identification information. Therefore, the account operation request, the account operation interaction data, and the identity credential of the user are simply and quickly obtained to complete an account operation corresponding to the account operation request, and the user does not need to call a manual customer service to apply for an interaction link and the interaction link does not need to be separately sent to the user by using the server. As such, the account operation of the user has relatively high efficiency and a relatively short period, and security of the account information of the user is improved, thereby improving use experience of the user.

In some implementations of the present specification, the account operation request includes an account information modification request, and the account information modification request is used to modify login verification information and/or a bound communication account set by the user in the account information, and the account operation interaction data includes login verification information and/or a bound communication account updated by the user.

In some other implementations of the present specification, the account operation request includes an account restriction state change request, and the account operation interaction data includes an account restriction release request input by the user.

In still some implementations of the present specification, the account operation request includes a problem feedback request, and the account operation interaction data includes account exception information input by the user.

In yet some implementations of the present specification, the account operation request includes an account theft appeal request, and the account operation interaction data includes user-set login verification information and an account-bound communication account updated by the user.

In this implementation of the present specification, when the account operation request includes the account information modification request, and the account information modification request is only used to modify one of the login verification information and the bound communication account, for example, when the account information modification request is only used to modify the login verification information, the user can still log in to the account by using the bound communication account, and modify the login verification information on an account management page when the user is in a login state.

Therefore, the information processing apparatus in this implementation of the present specification further includes: a second instruction sending module, configured to send a second display instruction to the terminal device, so that the terminal device displays a login operation interface, where the login operation interface is used to receive a state keeping instruction indicating that the user determines to keep in the non-login state; and a keeping instruction receiving module, configured to receive the state keeping instruction. In this case, the first instruction sending module 730 is further configured to send the first display instruction to the terminal device in response to the state keeping instruction.

Therefore, in this implementation of the present specification, in addition to that the user can still perform the account operation on the account information of the user when the user is in the non-login state, an account operation method that the user can perform the account operation on the account management page when the user is in the login state is further provided to the user, thereby improving flexibility of performing the account operation by the user and improving use experience of the user.

The information processing apparatus in this implementation of the present specification further includes: a second information receiving module, configured to receive the account operation interaction data and the identity credential sent by the terminal device; and an operation order generation module, configured to generate a to-be-verified account operation order corresponding to the account operation request based on the account operation interaction data and the identity credential.

In this case, after receiving the account operation interaction data and the identity credential sent by the terminal device, the server can generate the to-be-verified account operation order corresponding to the account operation request based on the account operation interaction data and the identity credential, so as to verify the account operation interaction data and the identity credential input by the user.

The information processing apparatus in this implementation of the present specification further includes a terminal security detection module, configured to determine a security detection result corresponding to the account operation request. In this case, the operation order generation module is further configured to generate the to-be-verified account operation order corresponding to the account operation request by using the account operation interaction data, the identity credential, and the security detection result.

Specifically, the terminal security detection module can be further configured to: receive terminal information of the terminal device sending the account operation request, and determine the security detection result corresponding to the account operation request based on a result of matching between the terminal information and target terminal information, where the target terminal information includes historical login terminal information and/or blacklisted terminal information corresponding to the account information.

Therefore, the security detection result can also be used when the to-be-verified account operation order is generated, so that a risk of performing the account operation corresponding to the account operation request can be more comprehensively evaluated, reliability of the verification result can be improved, and the risk of performing the account operation corresponding to the account operation request can be reduced, thereby improving security of account information of the user.

The information processing apparatus in this implementation of the present specification further includes: a verification result acquisition module, configured to obtain a verification result of the to-be-verified account operation order; and an account operation execution module, configured to perform an account operation corresponding to the account operation request based on the account operation interaction data if the verification result is that verification succeeds.

Figure 10:
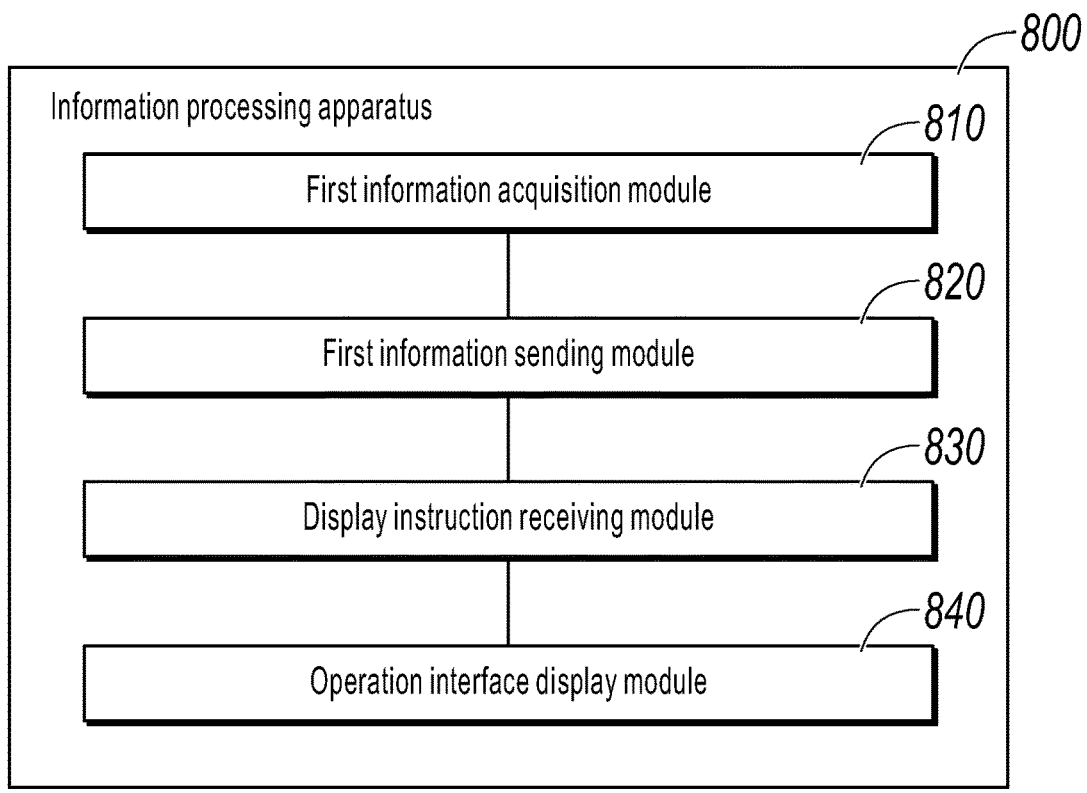
FIG. 10 is a schematic structural diagram illustrating an information processing apparatus, according to another implementation of the present specification.

FIG. 10 is a schematic structural diagram illustrating an information processing apparatus, according to another implementation of the present specification. As shown in FIG. 10, the information processing apparatus 800 applied to a terminal device includes: a first information acquisition module 810, configured to: when a user is in a non-login state, obtain an account operation request and identity identification information of the user; a first information sending module 820, configured to send the account operation request and the identity identification information to a target device; a display instruction receiving module 830, configured to receive a first display instruction sent by the target device when the target device finds account information; and an operation interface display module 840, configured to display an account operation interface for the account operation request in response to the first display instruction, where the account operation interface is used to receive account operation interaction data of the user and an identity credential corresponding to the identity identification information.

In this implementation of the present specification, the terminal device can directly obtain the account operation request and the identity identification information of the user when the user is in the non-login state, and send the account operation request and the identity identification information to the target device, so that the target device queries the account information corresponding to the identity identification information in response to the account operation request, and sends the first display instruction to the terminal device when finding the account information; and the terminal device can directly display the account operation interface for the account operation request in response to the first display instruction to receive the account operation interaction data of the user and the identity credential corresponding to the identity identification information. Therefore, the account operation request, the account operation interaction data, and the identity credential of the user are simply and quickly obtained to complete an account operation corresponding to the account operation request, and a manual customer service does not need to separately send an interaction link to the user. As such, the account operation of the user has relatively high efficiency and a relatively short period, and security of the account information of the user is improved, thereby improving use experience of the user.

In this implementation of the present specification, the operation interface display module 840 is further configured to: display an information input interface in response to the account operation request obtained by the first information acquisition module, where the information input interface is used by the first information acquisition module to obtain the identity identification information of the user.

The information processing apparatus in this implementation of the present specification further includes: a second information acquisition module, configured to obtain the account operation interaction data and the identity credential input by the user; and a second information sending module, configured to send the account operation interaction data and the identity credential to the target device.

Figure 11:
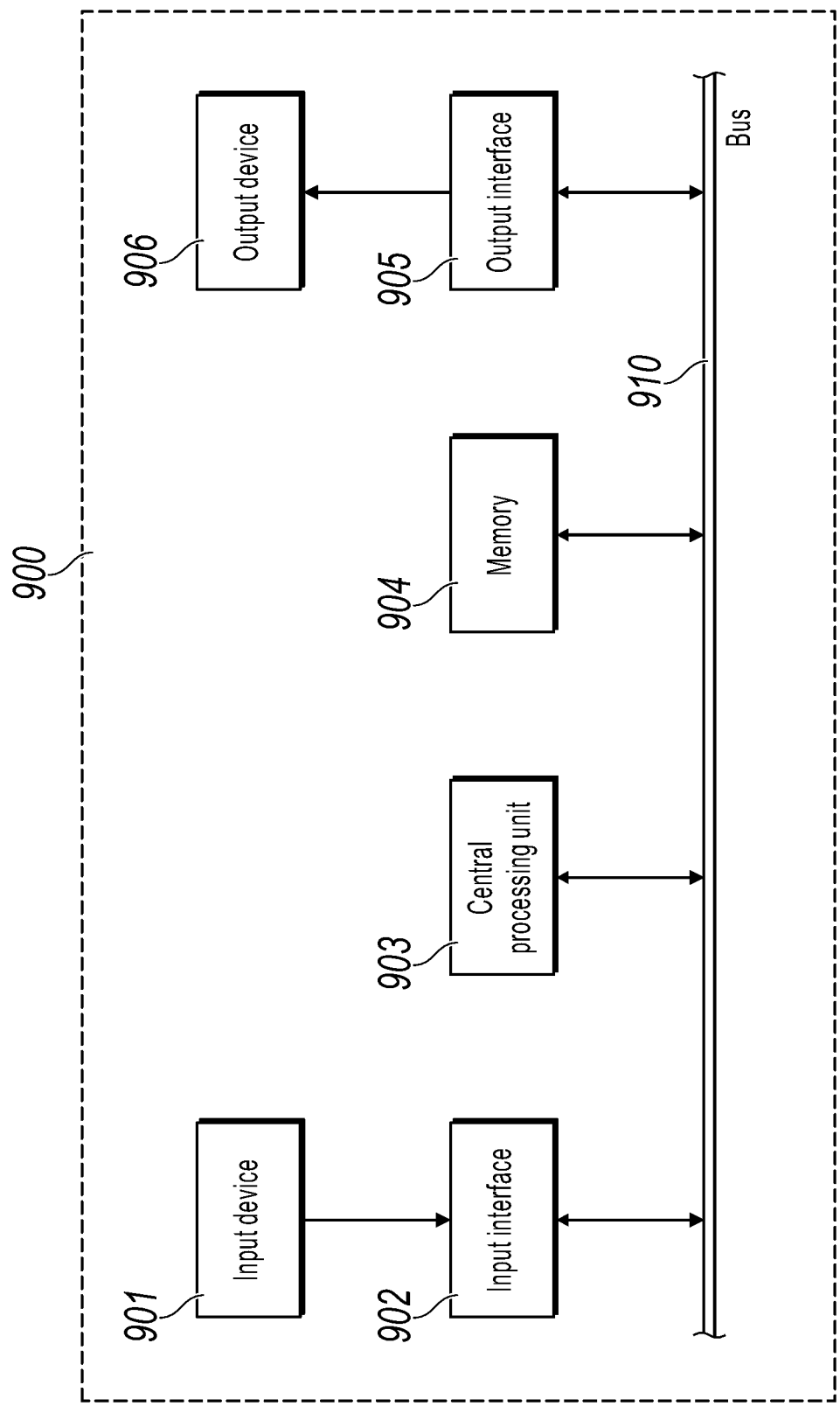
FIG. 11 is a schematic structural diagram illustrating hardware of an information processing device, according to an implementation of the present specification.

FIG. 11 is a schematic structural diagram illustrating hardware of an information processing device, according to an implementation of the present specification. The information processing device in this implementation of the present specification can be a server or a terminal device. As shown in FIG. 11, an information processing device 900 includes an input device 901, an input interface 902, a central processing unit 903, a memory 904, an output interface 905, and an output device 906. The input interface 902, the central processing unit 903, the memory 904, and the output interface 905 are connected to each other by using a bus 910, and the input device 901 and the output device 906 are separately connected to the bus 910 through the input interface 902 and the output interface 905, so as to be connected to another component of the information processing device 900.

Specifically, the input device 901 receives input information from the outside, and transmits the input information to the central processing unit 903 through the input interface 902. The central processing unit 903 processes the input information based on a computer executable instruction stored in the memory 904 to generate output information, temporarily or permanently stores the output information in the memory 904, and then transmits the output information to the output device 906 through the output interface 905. The output device 906 outputs the output information to the outside of the information processing device 900 for use by a user.

To be specific, the information processing device shown in FIG. 11 can include a memory storing a computer executable instruction, and a processor. When executing the computer executable instruction, the processor can implement the information processing method and apparatus described in the implementations of the present specification.

An implementation of the present specification further provides a computer readable storage medium. The computer readable storage medium stores a computer program instruction, and when the computer program instruction is executed by a processor, the information processing method in the implementations of the present specification is implemented.

The previous function block shown in the structural block diagram can be implemented as hardware, software, firmware, or a combination thereof. When the function block is implemented in a form of hardware, the function block can be, for example, an electronic circuit, an application specific integrated circuit (ASIC), an appropriate firmware, a plug-in, a function card, etc. When the function block is implemented in a form of software, an element in the present specification is a program or a code segment that is used to execute a required task. The program or the code segment can be stored in a machine readable medium, or transmitted on a transmission medium or a communication link by using a data signal carried in a carrier. The "machine readable medium" can include any medium capable of storing or transmitting information. Examples of the machine readable medium include an electronic circuit, a semiconductor memory device, a ROM, a flash memory, an erasable ROM (EROM), a floppy disk, a CD-ROM, an optical disk, a hard disk, an optical fiber medium, a radio frequency (RF) link, etc. The code segment can be downloaded through a computer network such as the Internet or the Intranet.

It is further worthwhile to note that specific implementations of the present specification are described above. Other implementations fall within the scope of the appended claims. In some cases, the actions or steps described in the claims can be performed in an order different from the order in the implementations and the desired results can still be achieved. In addition, the process depicted in the accompanying drawings does not necessarily need a particular execution order to achieve the desired results. In some implementations, multi-tasking and concurrent processing is feasible or may be advantageous.

The previous descriptions are merely specific implementations of the present specification, and a person skilled in the art can clearly understand that for convenience and brevity of description, for a specific working process of the previous described system, module, and unit, reference can be made to a corresponding process in the previous method implementations, and details are omitted here for simplicity. It should be understood that the protection scope of the present specification is not limited thereto. Any person skilled in the art can easily figure out various equivalent modifications or replacements without departing from the technical scope disclosed in the present specification, and all these modifications or replacements shall fall within the protection scope of the present specification.

What is claimed is:

1. A computer-implemented method, comprising:
   receiving, from a terminal device of a user, (1) a request to perform an account operation for a user account and (2) user identity identification information;
   querying account information corresponding to the user identity identification information in response to receiving the request;
   subsequent to querying the account information, sending a first display instruction to the terminal device, wherein the first display instruction comprises executable code that causes the terminal device to display an account operation interface for the request, and wherein the account operation interface is configured to receive account operation interaction data of the user and an identity credential corresponding to the user identity identification information;
   receiving, from the terminal device, the account operation interaction data and the identity credential;
   generating a to-be-verified account operation order based on the account operation interaction data and the identity credential;
   obtaining a verification result of the to-be-verified account operation order;
   determining the verification result corresponds to a successful verification; and
   subsequent to determining the verification result corresponds to the successful verification, performing the account operation of the request based on the account operation interaction data.

2. The computer-implemented method of claim 1, wherein the request comprises an account information modification request to modify login verification information or a bound communication account set by the user in the account information, and the account operation interaction data comprises updated login verification information or an updated bound communication account provided by the user.

3. The computer-implemented method of claim 2, further comprising, before sending the first display instruction to the terminal device:
   sending a second display instruction to the terminal device, wherein the second display instruction comprises executable code that causes the terminal device to display a login operation interface, wherein the login operation interface is configured to receive a state keeping instruction indicating that the user determines to remain in a non-login state;
   receiving the state keeping instruction; and
   sending the first display instruction to the terminal device in response to receiving the state keeping instruction.

4. The computer-implemented method of claim 1, wherein the request comprises an account restriction state change request, and the account operation interaction data comprises an account restriction release request input by the user;

the request comprises a problem feedback request, and the account operation interaction data comprises account exception information input by the user; or the request comprises an account theft appeal request, and the account operation interaction data comprises user-set login verification information and an account-bound communication account updated by the user.

5. The computer-implemented method of claim 1, wherein the generating the to-be-verified account operation order corresponding to the request based on the account operation interaction data and the identity credential comprises:

determining a security detection result corresponding to the request; and generating the to-be-verified account operation order corresponding to the request based on the account operation interaction data, the identity credential, and the security detection result.

6. The computer-implemented method of claim 5, wherein determining the security detection result corresponding to the request comprises:

receiving terminal information of the terminal device sending the request; and determining the security detection result corresponding to the request based on a result of matching between the terminal information and target terminal information, wherein the target terminal information comprises historical login terminal information or blacklisted terminal information corresponding to the account information.

7. A non-transitory, computer-readable medium storing one or more instructions executable by a computer system to perform operations comprising:

receiving, from a terminal device of a user, (1) a request to perform an account operation for a user account and (2) user identity identification information;

querying account information corresponding to the user identity identification information in response to receiving the request;

subsequent to querying the account information, sending a first display instruction to the terminal device, wherein the first display instruction comprises executable code that causes the terminal device to display an account operation interface for the request, and wherein the account operation interface is configured to receive account operation interaction data of the user and an identity credential corresponding to the user identity identification information;

receiving, from the terminal device, the account operation interaction data and the identity credential;

generating a to-be-verified account operation order based on the account operation interaction data and the identity credential;

obtaining a verification result of the to-be-verified account operation order;

determining the verification result corresponds to a successful verification; and subsequent to determining the verification result corresponds to the successful verification, performing the account operation of the request based on the account operation interaction data.

8. The non-transitory, computer-readable medium of claim 7, wherein the request comprises an account information modification request to modify login verification information or a bound communication account set by the user in the account information, and the account operation interaction data comprises updated login verification information or an updated bound communication account provided by the user.

9. The non-transitory, computer-readable medium of claim 8, further comprising, before sending the first display instruction to the terminal device:

sending a second display instruction to the terminal device, wherein the second display instruction comprises executable code that causes the terminal device to display a login operation interface, wherein the login operation interface is configured to receive a state keeping instruction indicating that the user determines to remain in a non-login state;

receiving the state keeping instruction; and sending the first display instruction to the terminal device in response to receiving the state keeping instruction.

10. The non-transitory, computer-readable medium of claim 7, wherein the request comprises an account restriction state change request, and the account operation interaction data comprises an account restriction release request input by the user;

the request comprises a problem feedback request, and the account operation interaction data comprises account exception information input by the user; or the request comprises an account theft appeal request, and the account operation interaction data comprises user-set login verification information and an account-bound communication account updated by the user.

11. The non-transitory, computer-readable medium of claim 7, wherein the generating the to-be-verified account operation order corresponding to the request based on the account operation interaction data and the identity credential comprises:

determining a security detection result corresponding to the request; and generating the to-be-verified account operation order corresponding to the request based on the account operation interaction data, the identity credential, and the security detection result.

12. The non-transitory, computer-readable medium of claim 11, wherein determining the security detection result corresponding to the request comprises:

receiving terminal information of the terminal device sending the request; and determining the security detection result corresponding to the request based on a result of matching between the terminal information and target terminal information, wherein the target terminal information comprises historical login terminal information or blacklisted terminal information corresponding to the account information.

13. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

receiving, from a terminal device of a user, (1) a request to perform an account operation for a user account and (2) user identity identification information;

querying account information corresponding to the user identity identification information in response to receiving the request;

subsequent to querying the account information, sending a first display instruction to the terminal device, wherein the first display instruction comprises executable code that causes the terminal device to display an account operation interface for the request, and wherein the account operation interface is configured to receive account operation interaction data of the user and an identity credential corresponding to the user identity identification information;

receiving, from the terminal device, the account operation interaction data and the identity credential;

generating a to-be-verified account operation order based on the account operation interaction data and the identity credential;

obtaining a verification result of the to-be-verified account operation order;

determining the verification result corresponds to a successful verification; and subsequent to determining the verification result corresponds to the successful verification, performing the account operation of the request based on the account operation interaction data.

14. The computer-implemented system of claim 13, wherein the request comprises an account information modification request to modify login verification information or a bound communication account set by the user in the account information, and the account operation interaction data comprises updated login verification information or an updated bound communication account provided by the user.

15. The computer-implemented system of claim 14, further comprising, before sending the first display instruction to the terminal device:

sending a second display instruction to the terminal device, wherein the second display instruction comprises executable code that causes the terminal device to display a login operation interface, wherein the login operation interface is configured to receive a state keeping instruction indicating that the user determines to remain in a non-login state;

receiving the state keeping instruction; and sending the first display instruction to the terminal device in response to receiving the state keeping instruction.

16. The computer-implemented system of claim 13, wherein the request comprises an account restriction state change request, and the account operation interaction data comprises an account restriction release request input by the user;

the request comprises a problem feedback request, and the account operation interaction data comprises account exception information input by the user; or the request comprises an account theft appeal request, and the account operation interaction data comprises user-set login verification information and an account-bound communication account updated by the user.

17. The computer-implemented system of claim 13, wherein the generating the to-be-verified account operation order corresponding to the request based on the account operation interaction data and the identity credential comprises:

determining a security detection result corresponding to the request; and generating the to-be-verified account operation order corresponding to the request based on the account operation interaction data, the identity credential, and the security detection result.

18. The computer-implemented system of claim 17, wherein determining the security detection result corresponding to the request comprises:

receiving terminal information of the terminal device sending the request; and determining the security detection result corresponding to the request based on a result of matching between the terminal information and target terminal information, wherein the target terminal information comprises historical login terminal information or blacklisted terminal information corresponding to the account information.

* * * * *